United States Patent
Barzegar et al.

(10) Patent No.: US 8,503,411 B1
(45) Date of Patent: Aug. 6, 2013

(54) METHOD AND APPARATUS FOR PROVIDING A VOIP SERVER IN A WIRELESS INTEGRATED DEVICES

(75) Inventors: Farhad Barzegar, Branchburg, NJ (US); Irwin Gerszberg, Kendall Park, NJ (US); Thomas Hill, Oviedo, FL (US); Scott Mollica, Red Bank, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 578 days.

(21) Appl. No.: 11/602,854

(22) Filed: Nov. 21, 2006

(51) Int. Cl.
*H04W 4/00* (2009.01)

(52) U.S. Cl.
USPC ........... 370/338; 370/311; 370/329; 370/352; 455/432.3; 455/435.1; 455/434; 455/426.2; 455/455; 455/414.1; 455/417; 455/567; 455/445; 379/76

(58) Field of Classification Search
USPC .................................................. 455/567, 445
See application file for complete search history.

(56) References Cited

U.S. PATENT DOCUMENTS

| | | | | |
|---|---|---|---|---|
| 5,454,032 A | * | 9/1995 | Pinard et al. | 379/167.05 |
| 5,631,953 A | * | 5/1997 | Thomas et al. | 370/260 |
| 5,963,864 A | * | 10/1999 | O'Neil et al. | 455/445 |
| 6,529,119 B1 | * | 3/2003 | Kumar et al. | 340/10.2 |
| 7,466,810 B1 | * | 12/2008 | Quon et al. | 379/201.01 |
| 7,570,631 B2 | * | 8/2009 | Bennett | 370/352 |
| 2003/0035471 A1 | * | 2/2003 | Pitsoulakis | 375/222 |
| 2006/0142012 A1 | * | 6/2006 | Kirchhoff et al. | 455/445 |
| 2006/0159073 A1 | * | 7/2006 | Chun | 370/352 |
| 2007/0047704 A1 | * | 3/2007 | Kafka | 379/112.05 |
| 2008/0101588 A1 | * | 5/2008 | Bruce et al. | 379/373.01 |

* cited by examiner

*Primary Examiner* — Nimesh Patel

(57) ABSTRACT

A method and apparatus for handling a call using a wireless integrated access device that is compatible with Voice over ATM and Voice over DSL on a network side while being compatible with VoIP on a customer premise side are disclosed. For example, the present method employs a wireless integrated access device for receiving an incoming call from a broadband access network that uses dedicated connection switching. In turn, the method establishes a wireless connection for the incoming call with at least one VoIP enabled endpoint device located at a customer premise.

9 Claims, 4 Drawing Sheets

METHOD AND APPARATUS FOR PROVIDING A VOIP SERVER IN A WIRELESS INTEGRATED DEVICES

The present invention relates generally to communication networks and, more particularly, to a method and apparatus for providing a VoIP server in a wireless integrated access device in a customer premise for communicating with a communication network, e.g., a packet network.

BACKGROUND OF THE INVENTION

Internet Protocol transport networks and services such as VoIP are becoming ubiquitous and businesses and consumers are relying on their Internet Protocol connections to obtain much of their communications services. However, in some instances, VoIP may experience quality issues that may be attributable to congestions, bandwidth constraints, failures, loss packets, and the like. Namely, due to the variability of the Internet, VoIP may experience quality problems from time to time.

In some networks, voice data can be transmitted using a dedicated-connection switching technology such as Asynchronous Transfer Mode (ATM) or Digital Subscriber Loop (DSL). This is referred to as Voice over ATM and Voice over DSL and the audio quality for such dedicated-connection switching technology is often very good. However, some endpoint devices that are compatible with VoIP may not be compatible with Voice over ATM and Voice over DSL.

Therefore, a need exists for a method and apparatus for providing a wireless integrated access device that is compatible with Voice over ATM and Voice over DSL on a network side while being compatible with VoIP on a customer premise side.

SUMMARY OF THE INVENTION

In one embodiment, the present invention discloses a method and apparatus for handling a call using a wireless integrated access device that is compatible with Voice over ATM and Voice over DSL on a network side while being compatible with VoIP on a customer premise side. For example, the present method employs a wireless integrated access device for receiving an incoming call from a broadband access network that uses dedicated connection switching. In turn, the method establishes a wireless connection for the incoming call with at least one VoIP enabled endpoint device located at a customer premise.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
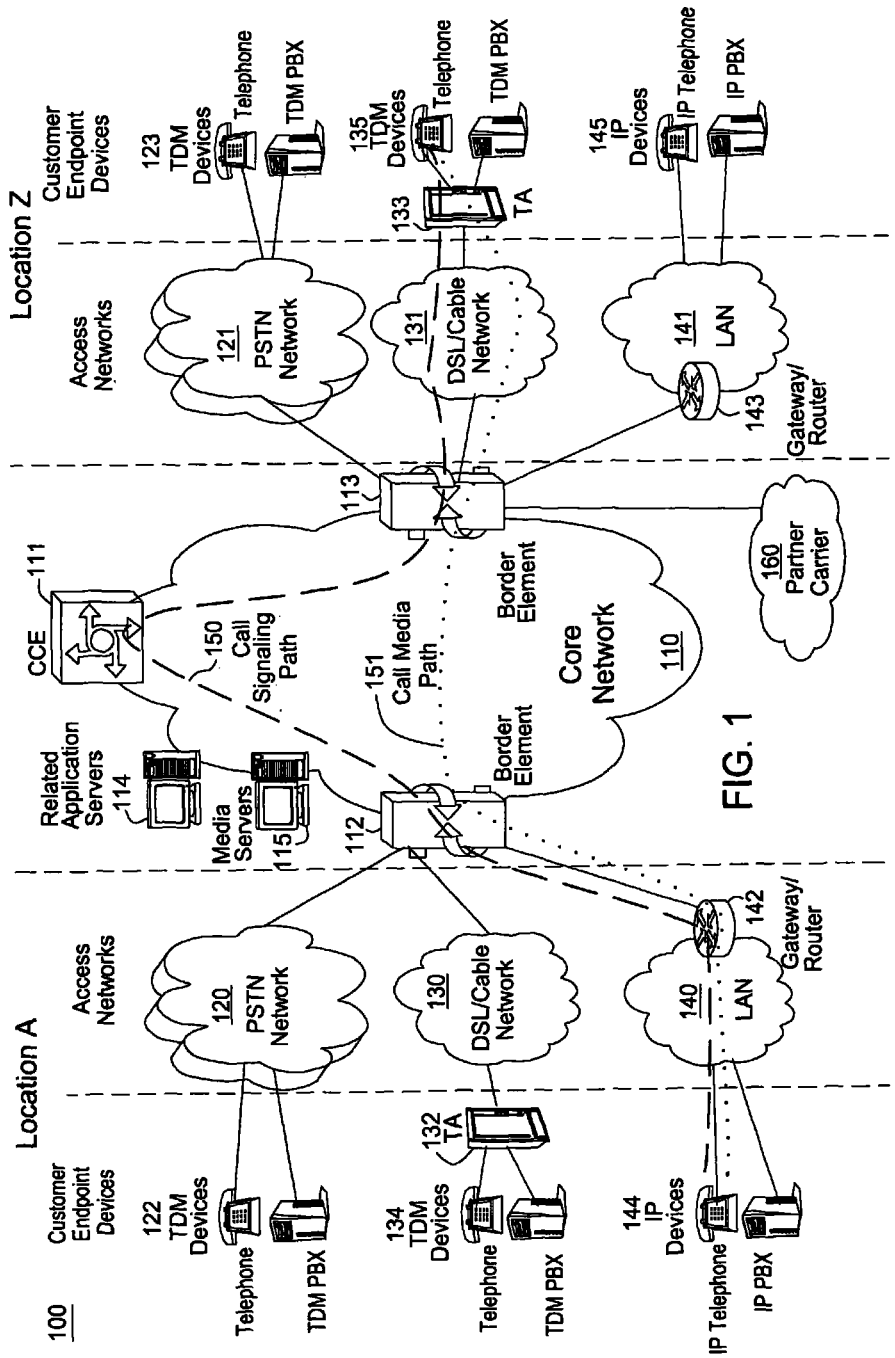
FIG. 1 illustrates an illustrative packet network related to the present invention.

To better understand the present invention, FIG. 1 illustrates a communication architecture 100 having an example network, e.g., a packet network related to the present invention. It should be noted that exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the packet network may comprise various types of customer endpoint devices connected via various types of access networks to a carrier (a service provider) core infrastructure, e.g., over an ATM core backbone network or an Internet Protocol/Multi-Protocol Label Switching (IP/MPLS) based core backbone network. Broadly defined, a packet network is a network that is capable of carrying voice signals as packetized data over a packet network. Although the present invention is described below in the context of an illustrative IP network, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices may access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as Fiber, DSL or Cable, when used together with a TA 132 or 133, is used to support TDM based customer endpoint devices.

In one illustrative embodiment, the core infrastructure comprises of several key components, such the Border Element (BE) 112 and 113, the Call Control Element (CCE) 111, and related servers 114. The BE resides at the edge of the core infrastructure and interfaces with customers endpoints over various types of access networks. A BE is typically implemented as a Media Gateway and performs signaling, media control, security, and call admission control and related functions. The CCE resides within the infrastructure and is connected to the BEs, e.g., using the Session Initiation Protocol (SIP) over the underlying core backbone network 110, e.g., an IP/MPLS based core backbone network or an ATM based core backbone network. The CCE is typically implemented as a Media Gateway Controller or a softswitch and performs network wide call control related functions as well as interacts with the appropriate service related servers when necessary. In one embodiment, the CCE functions as a SIP back-to-back user agent and is a signaling endpoint for all call legs between all BEs and the CCE. The CCE may need to interact with various related servers in order to complete a call that require certain service specific features, e.g. translation of an E.164 voice network address into an IP address and the like.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a call, the following call scenario is used to illustrate how a call is setup between two customer endpoints. For example, a customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

As discussed above, Internet Protocol transport networks and services such as VoIP are becoming ubiquitous and businesses and consumers are relying on their Internet Protocol connections to obtain much of their communications services. However, in some instances, VoIP may experience quality issues that may be attributable to congestions, bandwidth constraints, failures, loss packets, and the like. Namely, due to the variability of the Internet, VoIP may experience quality problems from time to time.

In some networks, voice data can be transmitted using a dedicated-connection switching technology such as Asynchronous Transfer Mode (ATM) or Digital Subscriber Loop (DSL). This is referred to as Voice over ATM and Voice over DSL and the audio quality for such dedicated-connection switching technology is often very good. However, some endpoint devices that are compatible with VoIP may not be compatible with Voice over ATM and Voice over DSL.

To address this criticality, the present invention employs a wireless integrated access device (WIAD) that is deployed on the customer's premise (e.g., a home or an office) to interact with the Asynchronous Transfer Mode (ATM) network or Digital Subscriber Loop (DSL) network on the network side. Furthermore, the WIAD is able to communicate wirelessly with various endpoint devices using the Internet Protocol. Thus, the WIAD is able to exploit the reliability of the dedicated-connection switching technology such as Asynchronous Transfer Mode (ATM) or Digital Subscriber Loop (DSL) as a transport mechanism, while maintaining compatibility with an ever growing number of IP enabled endpoint devices, e.g., laptop computers, personal digital assistants (PDAs), and the like.

Figure 2:
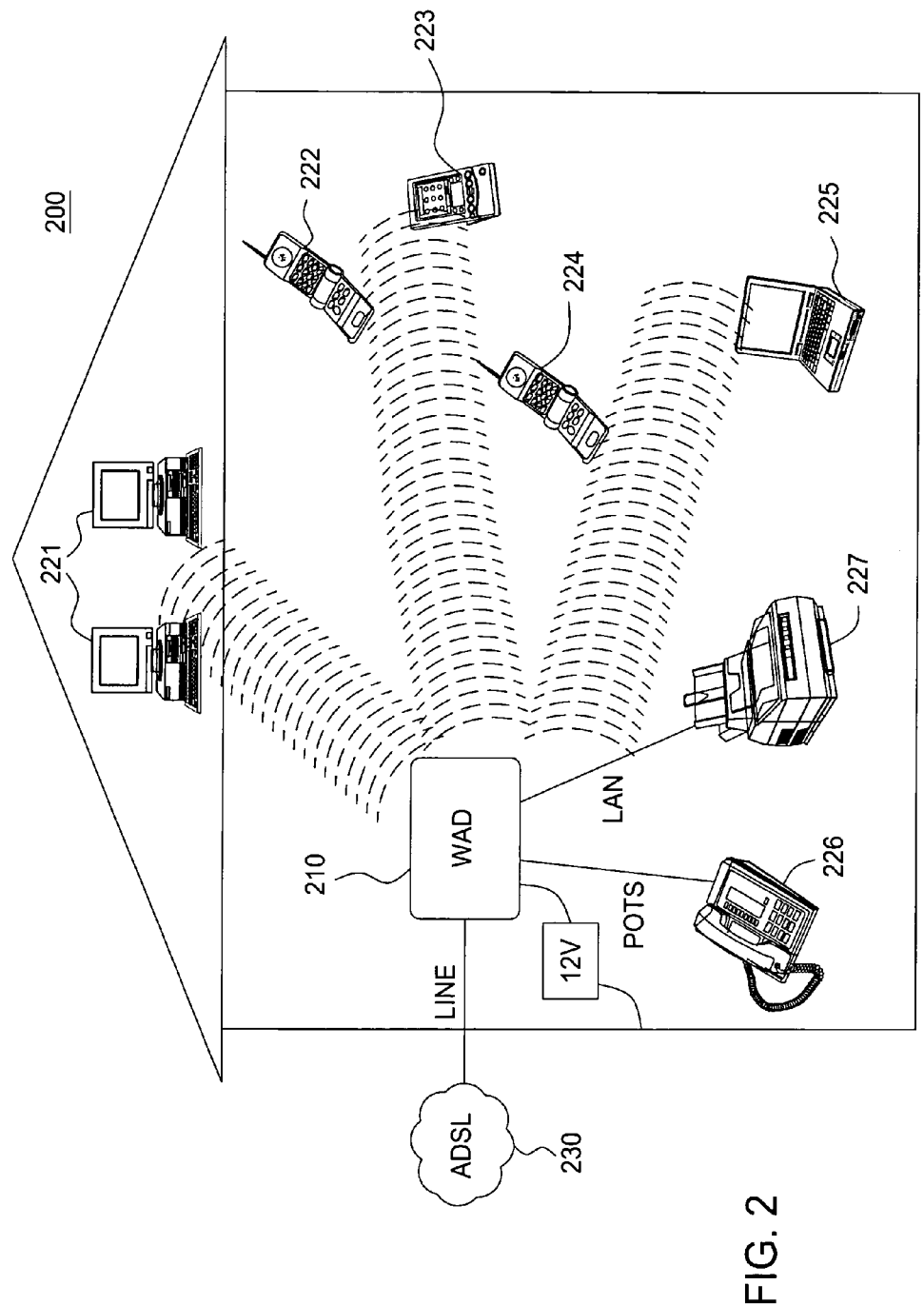
FIG. 2 illustrates an example of a wireless integrated access device that is deployed in a customer premise related to the present invention.

FIG. 2 illustrates an example of a wireless integrated access device 210 that is deployed in a customer premise 200 related to the present invention. In one embodiment, the wireless integrated access device (WIAD) 210 is deployed in a customer premise, e.g., a home, that is in wireless communication with a plurality of endpoint devices (e.g., desktop computers 221, a cordless digital telephone 222, a wireless computing device 223 (e.g., a personal digital assistant (PDA) and the like, a cellular phone 224, and a laptop computer 225. In one embodiment, the wireless integrated access device (WIAD) 210 may optionally interact with a traditional wired telephone 226 and one or more wired devices 227 (e.g., a printer) that are connected via a local area network (LAN).

One novel aspect of the present invention is that the WIAD 210 is in communication with a broadband access network 230, e.g., a Fiber network, or a DSL network that uses Asynchronous Transfer Mode (ATM) or Digital Subscriber Loop (DSL) as the underlying transport mechanism. As such, the reliability of the transport of the voice packets is fairly high once the voice packets are placed onto the access network and/or core backbone network. However, due to the popularity and flexibility of the IP enabled devices, the WIAD 210 also employs a VoIP server (e.g., via a software application) that is capable of interacting wirelessly with a plurality of IP enabled endpoint devices, e.g., a laptop computer. Namely, the WIAD 210 communicates with the various endpoint devices via IP. As such, each of the endpoint devices is an IP client of the WIAD. This approach allows the WIAD to exploit the reliability associated with Voice over ATM and Voice over DSL while using VoIP for interacting with wireless endpoint devices only inside the customer's premise.

For example, in one embodiment, if an incoming call is received by the WIAD, then the WIAD will cause an endpoint device, e.g., a computer 221, 225, a wireless computing device 223, a cordless digital telephone 222 and/or a cellular phone 224 to display a visible notification, e.g., an icon such as, a blinking or flashing icon, to appear on a display of the endpoint device to notify the customer that there is an incoming call for the customer. Alternatively, the visible notification may comprise activating a light emitting diode (LED), e.g., turning the LED on or causing the LED to flash. If the computer 221 or 225 is equipped with the appropriate input/output devices (e.g., speakers, microphone, key pad, and the like), the customer can simply use the computer to answer the call directly.

In one embodiment, if an incoming call is received by the WIAD, then the WIAD will cause an endpoint device, e.g., a computer 221, 225, a wireless computing device 223, a cordless digital telephone 222 and/or a cellular phone 224 to activate an audible device, e.g., a speaker to present an audible notification, e.g., a ringing tone, to notify the customer that there is an incoming call for the customer. In turn, the customer can simply use any of the ringing endpoint devices to answer the call directly. It should be noted that when the cellular phone 224 is used to answer the call, the cellular phone 224 is not accessing the cellular network. Instead, it is simply serving as an IP client to the WIAD and is communicating using IP.

Figure 3:
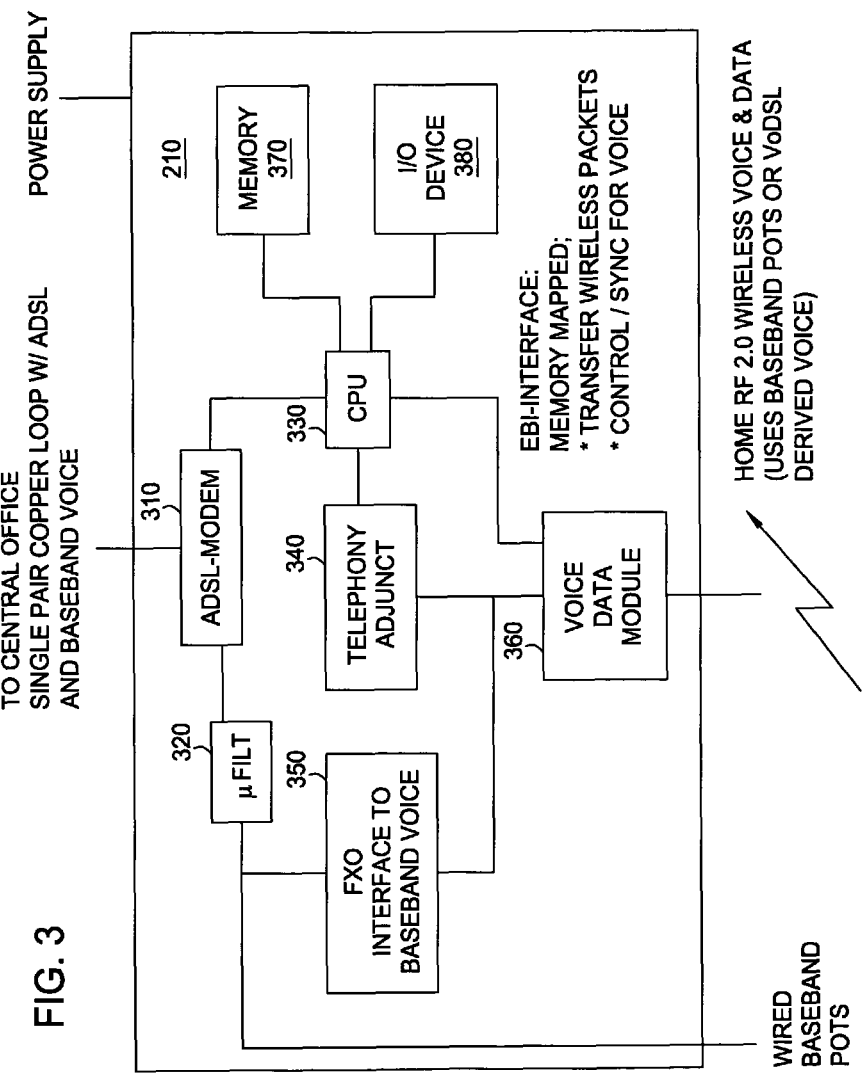
FIG. 3 illustrates a block diagram of an illustrative wireless integrated access device (WIAD)

FIG. 3 illustrates a block diagram of an illustrative wireless integrated access device 210. In one embodiment, the WIAD comprises a broadband modem, e.g., an ADSL or cable modem 310, a micro filter 320, a processor 330, a Telephony Adjunct 340 to provide extra digital voice lines from the broadband data, a Foreign Exchange Office (FXO) interface 350 to interface with ordinary Plain old telephone service (POTS) lines, a wireless Voice Data Module (VDM) 360 to provide the voice and data to a customer's endpoint devices wirelessly, a memory 370 e.g., random access memory (RAM) and/or read only memory (ROM), and I/O devices 380 (e.g., storage devices, including but not limited to, a tape drive, a floppy drive, a hard disk drive or a compact disk drive, a receiver, a transmitter, a speaker, a timer, a display, a speech synthesizer, an output port, and a user input device (such as a keyboard, a keypad, a mouse, and the like)).

In one embodiment, the WIAD 210 is connected to a phone line from the local telephone service provider. For example, the line is ADSL-enabled with a digital voice adjunct server in the Central Office (CO). On this line, a customer may receive the original POTS line service via the micro-filter 320, while the ADSL modem 310 will provide the broadband data. Namely, the basic POTS line voice line information is separated by the integrated micro-filter 320.

In one embodiment, the processor or CPU 330 may also provide router/firewall functionalities to protect the customer equipment. In one embodiment, the Telephony Adjunct 340 provides extra digital voice lines from the broadband data, e.g., up to two additional voice lines are digitally created by the integrated Telephony Adjunct (TA).

Finally, the data (non-voice data) and voice data are passed on wirelessly by the VDM to the various endpoint devices, e.g., wireless phones and computers in the customer premise. In one embodiment, the VDM uses a transceiver to communicate with the various endpoint devices. In one embodiment, the functions of a VoIP server is programmed into the VDM such that the VDM communicates with a plurality of IP enabled endpoint devices that are serving as VoIP clients to the WIAD.

In one embodiment, the PC 221 and/or 225 at the customer premise would have a wireless PC card that would register with the VDM 360 for receiving and transmitting data to the Internet via the ADSL modem to the CO and from there to the Internet. Similarly, when one of the wireless phones 222, 224 (broadly defined as a handset) is used, messages from the handset are transmitted to the VDM and through the DSL modem to the CO for connection with a telephony server.

In one embodiment, using wireless connections for the voice lines will remove the necessity of having to provide in-home wiring to endpoint devices. Furthermore, using the WIAD 210 for transmission of both non-voice data and voice data also ensures that the quality of service for the voice calls will be maintained. For example, when a voice call is made in the middle of a file download, the WIAD can ensure that packet losses or delay on voice call will be minimized at the expense of decreasing the download throughput.

Figure 4:
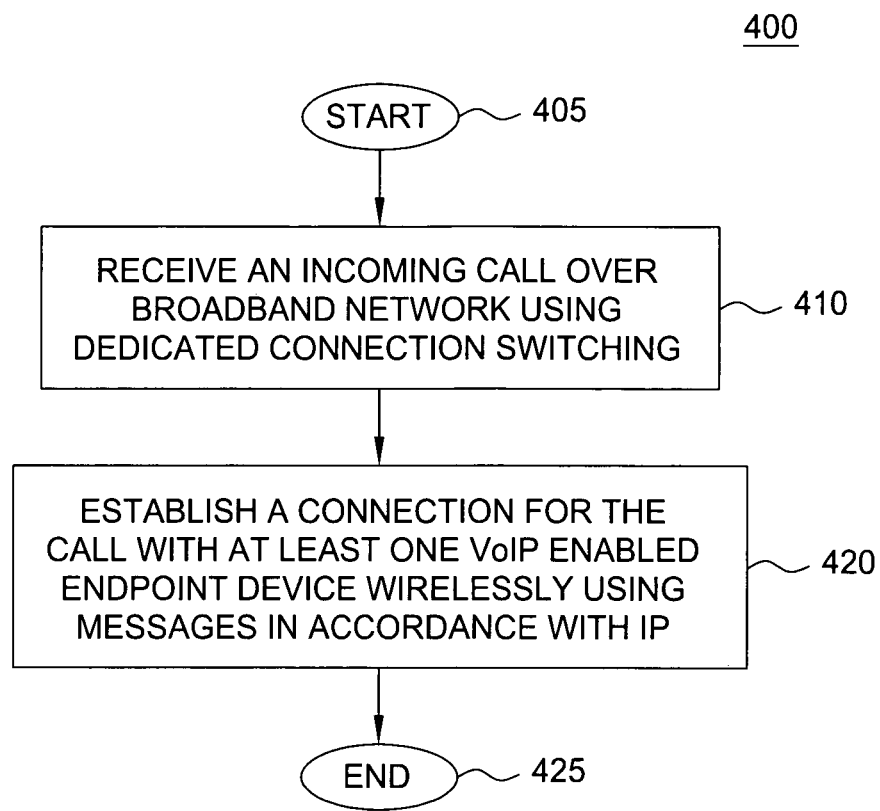
FIG. 4 illustrates a flowchart of a method for using a VoIP server in a WIAD for interacting with a plurality of IP enabled endpoint devices.

FIG. 4 illustrates a flowchart of a method for using a VoIP server in a WIAD for interacting with a plurality of IP enabled endpoint devices. For example, method 400 can be implemented by the WIAD of the present invention. Method 400 starts in step 405 and proceeds to step 410.

In step 410, method 400 receives an incoming call (e.g., a call setup message) over a broadband network using dedicated connection switching. For example, the call is transported over an Asynchronous Transfer Mode (ATM) network or a Digital Subscriber Loop (DSL) network.

In step 420, method 400 establishes wirelessly a connection for the call with at least one VoIP enabled endpoint device, e.g., a laptop, a wireless computing device, a cordless phone, a cellular phone and the like. More specifically, each of the endpoint enabled devices is capable of communicating with the WIAD in accordance with VoIP. Thus, each of the VoIP enabled endpoint devices is effectively a VoIP client of the WIAD, where the WIAD is performing functions of a VoIP server. Method 400 then ends in step 425.

Although method 400 is described above in the context of handling an incoming call, the present invention is not so limited. Namely, the method is equally applicable for handling outgoing calls as well. For example, method 400 may receive a Voice over ATM or Voice over DSL call setup message from one of the VoIP enabled endpoint devices, and then establishes a connection to a broadband network that is using dedicated-connection switching.

It should be noted that the present invention can be implemented in software and/or in a combination of software and hardware, or entirely in hardware, e.g., using application specific integrated circuits (ASIC), a general purpose computer or any other hardware equivalents. In one embodiment, the present module or process for providing voicemail notification can be loaded into memory and executed by processor to implement the functions as discussed above. As such, the present method for providing voicemail notification (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for handling an incoming call, comprising:
using a wireless integrated access device for receiving the incoming call from a broadband access network that uses dedicated connection switching, wherein the dedicated connection switching is implemented over an asynchronous transfer mode network, wherein the wireless integrated access device is deployed at a customer premises;
establishing a wireless connection for the incoming call with all of a plurality of voice over internet protocol enabled endpoint devices located at the customer premises to enable a customer to directly answer the incoming call using any one of the plurality of voice over internet protocol enabled endpoint devices, wherein the incoming call is routed directly from the wireless integrated access device to the one of the plurality of voice over internet protocol enabled endpoint devices used by the customer to directly answer the incoming call; and providing a notification on the plurality of voice over internet protocol enabled endpoint devices to indicate a presence of the incoming call, wherein the notification comprises a visible notification and an audible notification.

2. The method of claim 1, wherein the broadband access network comprises a fiber network.

3. The method of claim 1, wherein the plurality of voice over internet protocol enabled endpoint devices comprises a plurality of wireless computing devices.

4. A tangible computer-readable medium storing a plurality of instructions which, when executed by a processor, cause the processor to perform operations for handling an incoming call, the operations comprising:

using a wireless integrated access device for receiving the incoming call from a broadband access network that uses dedicated connection switching, wherein the dedicated connection switching is implemented over an asynchronous transfer mode network, wherein the wireless integrated access device is deployed at a customer premises;

establishing a wireless connection for the incoming call with all of a plurality of voice over internet protocol enabled endpoint devices located at the customer premises to enable a customer to directly answer the incoming call using any one of the plurality of voice over internet protocol enabled endpoint devices, wherein the incoming call is routed directly from the wireless integrated access device to the one of the plurality of voice over internet protocol enabled endpoint devices used by the customer to directly answer the incoming call; and providing a notification on the plurality of voice over internet protocol enabled endpoint devices to indicate a presence of the incoming call, wherein the notification comprises a visible notification and an audible notification.

5. The tangible computer-readable medium of claim 4, wherein the broadband access network comprises a fiber network.

6. The tangible computer-readable medium of claim 4, wherein the plurality of voice over internet protocol enabled endpoint devices comprises a plurality of wireless computing devices.

7. An apparatus for handling an incoming call, comprising:

a processor; and a computer-readable medium storing a plurality of instructions which, when executed by the processor, cause the processor to perform operations, the operations comprising:

receiving the incoming call from a broadband access network that uses dedicated connection switching, wherein the dedicated connection switching is implemented over an asynchronous transfer mode network, wherein the apparatus is deployed at a customer premises;

establishing a wireless connection for the incoming call with all of a plurality of voice over internet protocol enabled endpoint devices located at the customer premises to enable a customer to directly answer the incoming call using any one of the plurality of voice over internet protocol enabled endpoint devices, wherein the incoming call is routed directly from the wireless integrated access device to the one of the plurality of voice over internet protocol enabled endpoint devices used by the customer to directly answer the incoming call; and providing a notification on the plurality of voice over Internet protocol enabled endpoint devices to indicate a presence of the incoming call, wherein the notification comprises a visible notification and an audible notification.

8. The apparatus of claim 7, wherein the broadband access network comprises a fiber network.

9. The apparatus of claim 7, wherein the plurality of voice over internet protocol enabled endpoint devices comprises a plurality of wireless computing devices.

* * * * *